Figure 1:
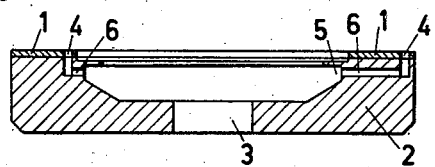

Oct. 29, 1963         E. LANDECK                3,108,941
CONTACT OR GRINDING WHEEL
Filed July 20, 1962                         2 Sheets-Sheet 1

Oct. 29, 1963   E. LANDECK   3,108,941
CONTACT OR GRINDING WHEEL
Filed July 20, 1962   2 Sheets-Sheet 2

United States Patent Office 3,108,941
Patented Oct. 29, 1963

3,108,941
CONTACT OR GRINDING WHEEL
Emil Landeck, Aarau, Switzerland, assignor to Maschinenfabrik Uerkheim AG., Uerkheim, Switzerland, a Swiss firm
Filed July 20, 1962, Ser. No. 211,165
Claims priority, application Switzerland Aug. 4, 1961
5 Claims. (Cl. 204—217)

The present invention relates to grinding wheels and contact wheels for the grinding and/or contact-electrolytic machining of workpieces.

The object of the invention is to provide a contact or grinding wheel, which makes it possible in operation to remove the produced particles quickly and reliably and, if necessary, to introduce a cooling liquid or an electrolyte, in order to form a uniform liquid film between the wheel and the workpiece.

In grinding or contact-electrolytic machining operations, the importance of removing the produced particles is at once evident. If the produced particles are not removed reliably, they tend to settle or deposit on the wheel, thus interfering with the further machining.

When grinding, it is very often desirable to employ a cooling liquid, which also diminishes the occurring friction and increases the life of the grinding wheel. With the known types of grinding wheels it is, however, difficult to bring the cooling liquid to the desired place so that it forms a film between the grinding wheel and the workpiece. In order to solve this problem, it has already been proposed in the case of ceramic grinding wheels to adopt porous kinds of bond and to introduce a liquid to the working surface through the pores of the grinding wheel, for which purpose advantage may be taken of the centrifugal force of the rotating wheel. However, in the case of grinding wheels with a homogeneous bond, as for instance diamond grinding wheels with metallic or synthetic-resin bond, this solution cannot be adopted; the cooling liquid must then be introduced from outside and, in the case of known wheels, no uniform film of liquid can be formed and no uniform cooling can be attained.

In the case of contact-electrolytic machining, the effective introduction of the electrolytic liquid to the working surface of the contact wheel and the formation of a uniform film of liquid on the wheel is of decisive importance for the working process, since the electrolyte is then a working liquid.

In order to achieve the aim of the invention and to solve the problems mentioned above, a contact or grinding wheel is proposed, which carries on a surface a closed annular contact and/or grinding layer and which, according to the invention, is characterized in that either a closed annular groove is provided in this layer, which groove is arranged in such manner that it is moved to and fro transversely to the direction of movement of the surface carrying the layer, when the wheel is rotated, or that the layer itself is arranged to move to and fro in this manner.

If the contact or grinding layer is relatively narrow, for instance up to 5 mm. wide on a wheel 125 mm. in diameter, it is sufficient to arrange the layer in the described manner. In the case of wider layers, however, it is generally preferable to provide the layer with an annular groove in the manner indicated.

In the simplest embodiments of the invention, the mentioned to and fro movement transversely to the direction of movement of the surface carrying layer is achieved, in the case of a cup wheel with lateral working surface, in that the annular groove or the layer has the shape of an eccentric circular ring, or, when the layer is arranged on the periphery of the wheel, in that the layer itself or the annular groove lies in a plane inclined to the plane of rotation of the wheel.

By the arrangement according to the invention of the contact or grinding layer or of an annular groove provided in it, there is achieved between the layer and a workpiece during the grinding process, in addition to the actual grinding movement, a to and fro movement in a direction transverse to the grinding movement. This to and fro movement ensures that, in the case of dry grinding, as well as with wet grinding or with electrolytic machining, the produced particles are effectively removed or carried to the edge of the layer or into the annular groove. In addition, when a cooling liquid or an electrolyte is being used, the to and fro movement assists in the formation of a uniform film of liquid between the layer and the workpiece.

If an annular groove is provided, this may of course be advantageously used for introducing a liquid by connecting the groove to a liquid supply means. The liquid may be introduced into the annular groove by means of centrifugal force, for instance from a delivery groove connected to the annular groove. Because of this introduction of liquid through the annular groove, the liquid is really brought to the place where it is required, namely onto the surface of the contact or grinding layer. This holds good particularly when the annular groove is arranged so that it nowhere leaves the layer. Since the liquid is led to the place where it is required, and since the annular groove renders possible a uniformly large flow of liquid, on the one hand the particles removed from the workpiece are reliably washed away, and on the other hand the total amount of liquid required for the grinding process is reduced, a fact of importance especially in the case of relatively expensive electrolyte liquids. In this respect the closed annular groove according to the invention cannot be compared with the rills or grooves in known contact or grinding wheels which leave the layer or working surface and terminate outside the working surface; such arrangements possess the drawback that the liquid is expelled for the most part without any useful effect. When machining electrolytically, another disadvantageous phenomenon is the occurrence of destructive edge electrolysis when rills emerge from the contact layer.

If a contact wheel constructed in accordance with the invention is used for electrolytic machining, because of the uniform film of electrolyte the source of current (generator) may be of considerably simpler construction than in the case of known contact wheels. In the latter, non-conducting spacing members (for instance diamonds) form the space for the flow of the electrolyte and thereby the formation of the electrolyte film. But these spacing members naturally wear down during the grinding process, thus giving rise to different thicknesses of the electrolyte-film, and these in turn must be compensated by a complicated control mechanism of the source of current. When, on the other hand, the electrolyte liquid is introduced through an annular groove in accordance with the invention, the thickness of the film of electrolyte always remains constant, and the complicated control mechanism can be eliminated.

When machining shapes that require careful machining such as radii grinding, grinding of very small chamfers, etc., in order not to have to alter the generator voltage and/or to change the contact or grinding wheel, the contact or grinding layer of the wheel according to the invention can be subdivided into two zones arranged beside each other and having different grinding effects. In the case of wheels for contact-electrolytic machining this is achieved by the contact layer having two annular zones with different current strengths. Then, in order that the annular groove does not cause trouble to the fine machining, it may be advisable with such wheels to arrange the annular groove only in the zone with the strongest grinding action.

Figure 2:
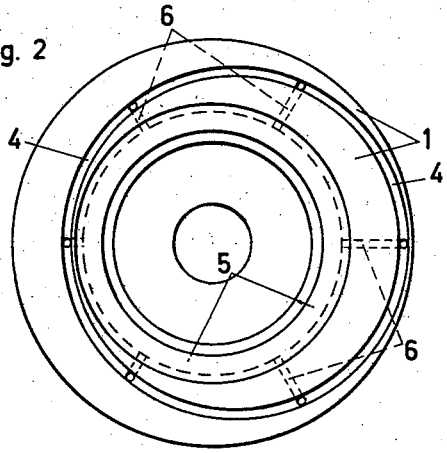
Figure 3:
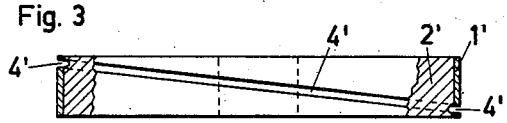
Figure 4:
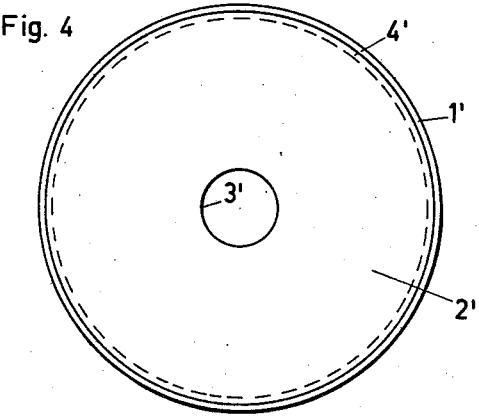
Figure 5:
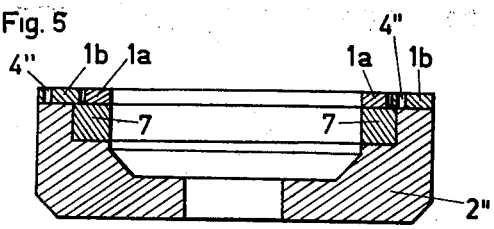
Figure 6:
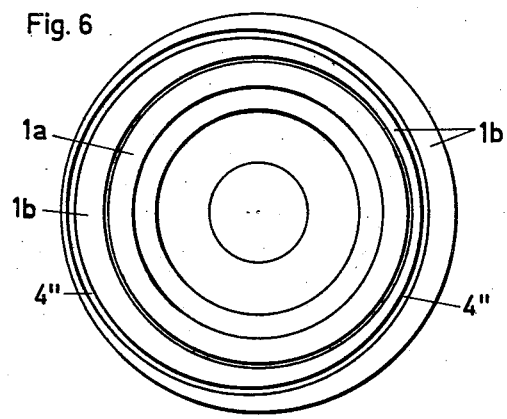
Figure 7:
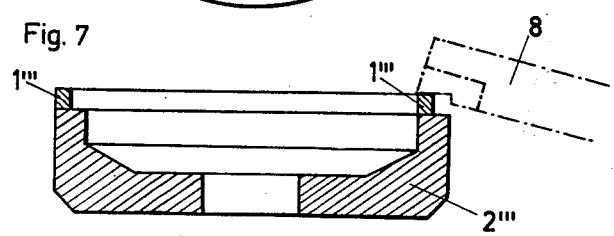
Figure 8:
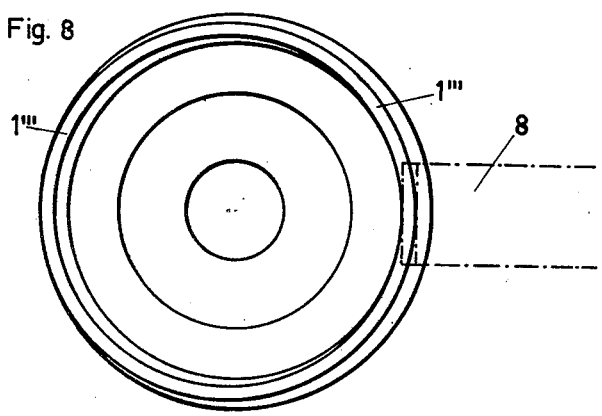

Some embodiments of the contact or grinding wheel according to the invention are illustrated by way of example in the drawing, where FIG. 1 shows an axial section through a contact or grinding wheel of the cup type, FIG. 2 a view of the wheel according to FIG. 1, seen in an axial direction, FIG. 3 a side view, partly in section, of a contact or grinding wheel with a contact layer arranged on the peripheral surface, FIG. 4 is a view of the wheel according to FIG. 3 in axial direction, FIG. 5 an axial section through a cup wheel, the contact layer of which is subdivided into two zones, FIG. 6 a view of the wheel according to FIG. 5 in axial direction, FIG. 7 an axial section through a cup wheel with eccentric contact or grinding layer, and FIG. 8 a view of the wheel according to FIG. 7 in axial direction.

The cup wheel illustrated in FIGS. 1 and 2 comprises a wheel body 2, which is provided with a central hole 3 for fixing on the spindle of a grinding machine. On a lateral surface of the wheel body 2 a closed annular contact or grinding layer 1 is arranged. In the layer 1 a closed annular groove 4 is provided which is so arranged that it is moved to and fro in the layer transverse to its direction of movement when the wheel is rotating. The annular groove 4 is shaped as an eccentric circular ring, which lies at one place close to the outer edge of the layer 1 and at another place close to the inner edge of that layer, without leaving the layer.

The annular groove 4 is connected by radial channels 6 to an annular supply groove 5.

In operation, with the wheel rotating, a cooling liquid or an electrolyte is introduced into the supply groove 5 and flows out of this groove 5 under the action of centrifugal force through the channels 6 into the annular groove 4. The rate of flow of the liquid through the channels 6 is determined by the cross-sectional area of these channels and by the speed of rotation of the wheel. The liquid issuing from the annular groove 4 is led to and fro on the surface of the layer 1 because of eccentric arrangement of the groove 4 and forms a uniform film of liquid on the said surface.

If the layer 1 is an ordinary grinding layer, the illustrated wheel may also be employed for dry grinding. In that case the annular groove 4 effects certain removal of the produced particles, which fall into the annular groove under the workpiece and are then thrown out of it.

It is obvious that the annular groove in the layer 1 could also have another shape, for instance the shape of an elliptic ring, which lies at two places close to the outer edge of the layer 1 and at two other places close to the inner edge of the layer.

FIG. 3 and 4 illustrate a contact or grinding wheel with a contact or grinding layer 1′ arranged on the periphery. The layer 1′ is carried by a wheel body 2′, which is provided with a central hole 3′ for fixing it.

In the layer 1′ a closed annular groove 4′ is provided, which is led to and fro in the layer 1′ transversely to the direction of movement of the layer when the wheel is rotating. The annular groove 4′ has the shape of an elliptic ring lying in a plane which is slightly inclined to the plane of rotation of the wheel.

In operation an electrolyte or a cooling liquid can be fed to the annular groove 4′ through channels (not shown) in order to form a uniform film of liquid on the surface of the layer 1′.

FIGS. 5 and 6 show an electrolytic contact wheel, with a contact layer which is subdivided into two zones. This wheel, which in other respects may be built similarly to the wheel according to FIGS. 1 and 2, comprises a wheel body 2″ with a lateral contact layer. This contact layer is subdivided into two zones 1a and 1b arranged beside each other and separated from each other. Under zone 1a of the contact layer, an electric resistance layer 7 is provided in the wheel body. This layer 7 may consist for instance of the same metal as the wheel body; in this case insulating substances, such as glass, quartz, aluminium oxide, silicon carbide or the like, are sintered-in to increase the resistance. The layer 7 may, however, also consist of a resistance alloy.

The dimensions and characteristics of the resistance layer 7 are chosen in such a way that when a small workpiece is machined on the zone 1a the current strength is only about one-third, say, of the current strength when machining on the zone 1b. The contact layer of this wheel has thus two zones through which pass currents of different strengths, and on which the grinding actions therefore differ in strength.

Also with this wheel, a closed annular groove 4″ in the shape of an eccentric circular ring is provided in the contact layer. This annular groove is arranged only in the zone with the stronger grinding action, i.e. in the zone 1b of the contact layer, whilst the zone 1a has a smooth surface. A rill or groove in the zone 1a might give rise to trouble during fine machining, especially if working free hand.

With the wheel according to FIGS. 5 and 6, larger workpieces as well as radii and very fine chamfers can be machined without changing the voltage of the source of current. With known contact wheels that is not the case; there rather, when machining sensitive shapes and/or small workpieces, the the voltage of the current source must normally be considerably diminished and/or the contact wheel changed, in order to avoid troublesome sparking, since it is difficult to introduce the workpieces when the contact surfaces are very small. In the case of the wheel according to FIGS. 5 and 6 these complications are eliminated. Nevertheless it has been found that with this latter wheel even a larger workpiece, extending over both zones of the contact layer, can be uniformly machined, since the electric currents equalize in the electrolyte.

FIGS. 7 and 8 show a cup wheel with an eccentric contact or grinding layer.

When a contact or grinding wheel has a very narrow layer, for instance a layer about 2 to 5 mm. wide on a wheel 125 mm. in diameter, it is impossible to provide an annular groove led to and fro in the layer. In such a case, an action similar to the action of the annular groove in the wheels hitherto described can be attained by arranging the layer itself in such a manner that it is moved to and fro on the surface of the contact or grinding wheel, transversely to the direction of movement of this surface.

The cup wheel according to FIGS. 7 and 8 therefore carries, on a lateral surface of a wheel body 2‴, a closed annular contact or grinding layer 1‴ which has the shape of an eccentric circular ring and is therefore moved to and fro transversely to the direction of movement of the said lateral surface.

This contact or grinding wheel may, for example, be employed for grinding a chip-breaking groove in the carbide tip of a lathe tool 8 (shown in chain-dotted lines). As can be seen from the drawing, the eccentricity of the layer 1‴ may be about equal to its width, whilst the surface to be ground on the workpiece is, for example, about twice as wide.

In operation there is, between the layer 1‴ and the workpiece 8, a to and fro movement in a direction transverse to the actual direction of machining. When this wheel is employed for grinding, the produced workpiece particles are effectively removed by this to and fro movement. If a cooling liquid is used for grinding, or if the machining is electrolytic, the said to and fro movement promotes distribution of the liquid, so that a uniform film is formed between the layer 1''' and the workpiece 8. Since the contact or grinding layer 1''' is relatively narrow, a sufficient quantity of liquid can be introduced by known means, and likewise in the case of dry grinding the produced particles quickly reach the edge of the layer.

It is obvious that a layer subdivided into two zones (FIGS. 5 and 6) or a layer moved to and fro on the surface carrying it (FIGS. 7 and 8) could also be arranged on the periphery of a wheel, as is the case with the wheel according to FIGS. 3 and 4. Further, in the case of the wheels last described, the annular groove or the contact or grinding layer could also be moved to and fro more than only once.

As compared with known contact wheels, electrolytic contact wheels of the described kind will allow—in consequence of the uniform film of liquid—an increase of production up to 30%, depending on the size and position of the machined surface of a workpiece that is in engagement.

What I claim is:

1. A contact wheel for electrolytic stock removal including a rotatable wheel body, an annular contact layer with parallel peripheral edges secured on said wheel body, said contact layer having a closed annular groove therein which is entirely disposed between said peripheral edges and non-uniformly spaced from the latter so that said groove moves to and fro transversely to the direction of movement of said layer when the wheel body is rotated, and means for supplying a liquid electrolyte to said groove to provide a uniform film of the electrolyte on the surface of said contact layer.

2. A contact wheel as in claim 1; wherein said contact layer includes two annular, electrically conductive zones arranged beside each other and having different electrical conductivities.

3. A contact wheel as in claim 2; wherein said closed annular groove is entirely disposed in the one of said zones having the higher electrical conductivity.

4. A contact wheel as in claim 1; wherein said wheel body is generally cup-shaped and said surface of the contact layer lies in a radial plane; and wherein said groove opens axially at said surface and is of circular configuration disposed eccentrically with respect to the axis of said wheel body.

5. A contact wheel as in claim 1; wherein said contact layer is cylindrical and arranged on the periphery of said wheel body; and wherein said groove opens radially outward in said surface of the contact layer and has an elliptical configuration lying in a plane inclined with respect to the plane of rotation of the wheel body.

References Cited in the file of this patent

UNITED STATES PATENTS

| | | |
|---|---|---|
| 278,608 | Schrebler | May 29, 1883 |
| 1,616,531 | King | Feb. 8, 1927 |
| 2,238,859 | Indge | Apr. 15, 1941 |
| 2,396,505 | Grimper | Mar. 12, 1946 |
| 2,697,878 | Oberley | Dec. 28, 1954 |
| 2,778,794 | Comstock | Jan. 22, 1957 |
| 3,007,288 | Brewin | Nov. 7, 1961 |

FOREIGN PATENTS

| | | |
|---|---|---|
| 523,253 | Italy | Apr. 14, 1955 |
| 804,762 | Germany | Apr. 30, 1951 |